(12) United States Patent
Wu

(10) Patent No.: US 11,280,943 B2
(45) Date of Patent: Mar. 22, 2022

(54) COLOR FILM SUBSTRATE AND DISPLAY PANEL

(71) Applicants: HKC Corporation Limited, Guangdong (CN); Chongqing HKC Optoelectronics Technology Co., Ltd., Chongqing (CN)

(72) Inventor: Chuan Wu, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 382 days.

(21) Appl. No.: 16/278,099

(22) Filed: Feb. 17, 2019

(65) Prior Publication Data

US 2020/0103569 A1    Apr. 2, 2020

Related U.S. Application Data

(63) Continuation of application No. PCT/CN2018/117062, filed on Nov. 23, 2018.

(30) Foreign Application Priority Data

Sep. 30, 2018    (CN) .......................... 201821622466.5

(51) Int. Cl.
    *G02B 5/20*    (2006.01)
    *G02F 1/1339*    (2006.01)
    *G02F 1/1362*    (2006.01)

(52) U.S. Cl.
    CPC ........... *G02B 5/201* (2013.01); *G02F 1/1339* (2013.01); *G02F 1/1362* (2013.01); *G02F 1/136222* (2021.01)

(58) Field of Classification Search
    CPC ..... H01L 27/322; H01L 33/58; H01L 51/525; H01L 27/156; H01L 33/502;
    (Continued)

(56) References Cited

U.S. PATENT DOCUMENTS 7,015,992 B2 * 3/2006 Nakayoshi ............ G02F 1/1333
                                                        349/106
2004/0090582 A1 * 5/2004 Ikeda ................... G02F 1/13394
                                                        349/130

(Continued)

FOREIGN PATENT DOCUMENTS

CN    103149729 A    6/2013
CN    103257482    *    8/2013

(Continued)

*Primary Examiner* — Hoan C Nguyen

(57) ABSTRACT

The present utility model discloses a color film substrate and a display panel. A first color resist, a second color resist, and a third color resist are respectively coated to a first attachment region, a second attachment region, a the third attachment region; the second color resist is further coated on the first color resist located on the first attachment region; the spacer layer includes a first spacer and a second spacer, the first spacer is coated on the color resist layer of the first attachment region, and the second spacer is partially coated on the color resist layer of the second attachment region or the third attachment region, the first spacer having the same thickness as the second spacer; the height of the upper surface of the first spacer from a substrate is higher than the height of the upper surface of the second spacer from the substrate.

7 Claims, 4 Drawing Sheets

(58) Field of Classification Search
CPC ......... H01L 51/5284; H01L 2933/0058; H01L 2933/0041; G02F 1/13394; G02F 1/133514; G02F 1/13396; G02F 1/1362; G02F 1/1339; G02F 1/136222; G02B 5/201

See application file for complete search history.

(56) References Cited

U.S. PATENT DOCUMENTS

| | | | | |
|---|---|---|---|---|
| 2004/0114087 | A1* | 6/2004 | Cho | G02F 1/13394 |
| | | | | 349/155 |
| 2005/0007525 | A1 | 1/2005 | Jun et al. | |
| 2006/0103786 | A1* | 5/2006 | Koma | G02F 1/133371 |
| | | | | 349/107 |
| 2008/0002136 | A1* | 1/2008 | Lee | G02F 1/13394 |
| | | | | 349/156 |
| 2018/0257974 | A1* | 9/2018 | Deng | G02F 1/133351 |
| 2019/0384098 | A1* | 12/2019 | Chen | G02F 1/133514 |
| 2020/0089032 | A1* | 3/2020 | Huang | G02F 1/133514 |

FOREIGN PATENT DOCUMENTS

| | | |
|---|---|---|
| CN | 106371243 A | 2/2017 |
| CN | 107065316 A | 8/2017 |
| CN | 107193162 A | 9/2017 |
| CN | 206946163 U | 1/2018 |

\* cited by examiner

COLOR FILM SUBSTRATE AND DISPLAY PANEL

CROSS REFERENCE TO RELATED APPLICATIONS

The present application is a Continuation Application of PCT Application No. PCT/CN2018/117062 filed on Nov. 23, 2018, which claims the benefit of Chinese Patent Application No. 201821622466.5 filed on Sep. 30, 2018. All the above are hereby incorporated by reference.

FIELD OF THE DISCLOSURE

The present disclosure relates to the field of liquid crystal display technologies, in particular, to a color film substrate, and a display panel.

BACKGROUND OF THE DISCLOSURE

The statements herein merely provide background information related to the present application and do not necessarily constitute prior art.

Thin Film Transistor-Liquid Crystal Display (TFT-LCD) includes an array substrate and a color film substrate. The array substrate controls the liquid crystal to deflect as a pixel switch, and the color film substrate is configured to provide color. A spacer is usually disposed between the array substrate and the color film substrate to support the gap between the two, so that the array substrate and the color film substrate may withstand a certain pressure during the process of the box and subsequent use, and maintain a certain thickness of the liquid crystal box.

In order to improve the process margin of the liquid crystal, it is usually necessary to configure the spacers to different heights so that at least a certain spacer gap is formed between the two spacers. If the difference of the spacer sections is too small, the liquid crystal process margin will be insufficient, and various display defects will occur; if the difference of spacer sections is too large, the display panel will be reduced in resistance to external pressure.

SUMMARY OF THE DISCLOSURE

The main purpose of the present application is to provide a color film substrate, which is intended to make the spacer in the color film substrate not only meet the requirement for section difference, but also has a simple process and low cost.

To achieve the above purpose, the color film substrate provided by the present application comprises:

a substrate on which a first attachment region, a second attachment region, and a third attaching region are formed;

a color resist layer including a first color resist, a second color resist and a third color resist; the first color resist, the second color resist, and the third color resist are respectively coated to the first attachment region, the second attachment region, and the third attachment region; the second color resist is further coated on the first color resist located in the first attachment region;

a spacer layer including the first spacer and the second spacer, the first spacer being coated on the color resist layer of the first attachment region, the second spacer being partially coated on the color resist layer of the second attachment region or the third attachment region, the first spacer having the same thickness as the second spacer;

the height of the upper surface of the first spacer from the substrate is higher than the height of the upper surface of the second spacer from the substrate.

Optionally, the thickness of the first color resist of the first attachment region is greater than the thickness of the second color resist of the second attachment region;

and/or, the thickness of the first color resist of the first attachment region is greater than the thickness of the third color resist of the third attachment region.

Optionally, the first attachment region, the second attachment region, and the third attachment region are sequentially arranged side by side.

Optionally, the first color resist is a blue color resist, the second color resist is a green color resist, and the third color resist is a red color resist.

Optionally, the third attachment region, the second attachment region, and the second attachment region are sequentially arranged side by side.

Optionally, the first color resist is a blue color resist, the third color resist is a green color resist, and the second color resist is a red color resist.

Optionally, the area of the first spacer and the second spacer attached to the color resist layer is the same.

Optionally, the spacer layer further includes a third spacer, and the first spacer, the second spacer, and the third spacer are respectively disposed in the first attachment region, the second attachment region, and the third attachment region.

Optionally, the first spacer, the second spacer, and the third spacer have the same thickness.

Optionally, the color film substrate further comprises a black matrix, and the black matrix defines a plurality of transparent regions and a plurality of opaque regions on the substrate; the first attachment region, the second attachment region, and the third attachment region are arranged in a strip shape, and each include the plurality of transparent regions arranged along a strip shape and the opaque region located between the two adjacent transparent regions;

the spacer is located on the color resist layer of the opaque region.

Optionally, the plurality of transparent regions and the plurality of opaque regions are divided into a plurality of pixel regions, and a part of the pixel regions is provided with the first spacer and the second spacer.

The present disclosure provides a color film substrate, wherein the color film substrate comprises:

a substrate on which a first attachment region, a second attachment region, and a third attaching region arranged sequentially side by side are formed;

a color resist layer including a first color resist, a second color resist and a third color resist; the first color resist, the second color resist, and the third color resist are respectively coated to the first attachment region, the second attachment region, and the third attachment region; the second color resist is further coated on the first color resist located in the first attachment region;

a spacer layer including a first spacer and a second spacer, the first spacer being coated on the color resist layer of the first attachment region, the second spacer being partially coated on the second attachment region, the first spacer having the same thickness as the second spacer, and the area of the first spacer and the second spacer attached to the color resist layer being the same;

the height of the upper surface of the first spacer from the substrate is higher than the height of the upper surface of the second spacer from the substrate.

The present disclosure further provides a display panel, wherein the display panel comprises an array substrate and a color film substrate, the color film substrate including:

a substrate on which a first attachment region, a second attachment region, and a third attaching region are formed;

a color resist layer including a first color resist, a second color resist and a third color resist; the first color resist, the second color resist, and the third color resist are respectively coated to the first attachment region, the second attachment region, and the third attachment region; the second color resist is further coated on the first color resist located in the first attachment region;

a spacer layer including a first spacer and a second spacer, the first spacer being coated on the color resist layer of the first attachment region, the second spacer being partially coated on the color resist layer of the second attachment region or the third attachment region, the first spacer having the same thickness as the second spacer;

the height of the upper surface of the first spacer from the substrate is higher than the height of the upper surface of the second spacer from the substrate;

the array substrate abuts on a side of the spacer layer facing away from the substrate.

In the technical solution of the present application, the spacer disposed on the color substrate includes a first spacer and a second spacer, and the first spacer is coated on the color resist layer of the first attachment region. The second spacer is coated to the second attachment region or the third attachment region, that is, the first spacer is disposed on the second color resist of the first attachment region. The second color resist is disposed on the first color resist of the first attachment region such that the first spacer is located above the two layers of color resist, and the second spacer is located above one layer of color resist, so that a natural height difference is formed between the first spacer and the second spacer directly in the process of manufacturing the color resist, thereby simplifying the overall manufacturing process of the color film substrate.

Further, in the technical solution of the present application, the thickness of the first spacer and the second spacer are the same, so that the first spacer and the second spacer are easily controlled in the process, and the cost is low.

BRIEF DESCRIPTION OF THE DRAWINGS

In order to illustrate the technical schemes in the embodiments of the present application or in the prior art more clearly, the drawings which are required to be used in the description of the embodiments or the prior art are briefly described below. It is obvious that the drawings described below are only some embodiments of the present application. It is apparent to those of ordinary skill in the art that other drawings may be obtained based on the structures shown in accompanying drawings without inventive effort.

Figure 1:
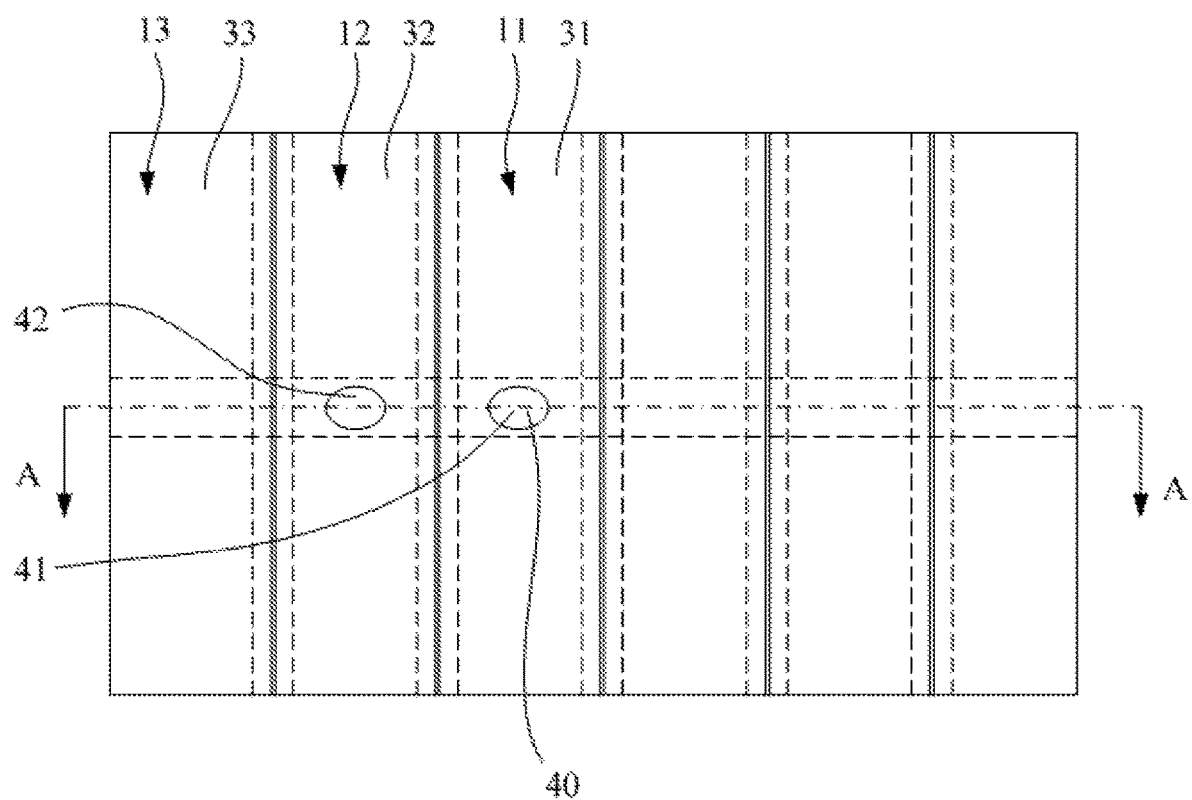
FIG. 1 is a top view of an embodiment of a color film substrate of the present application.

The object realization, function characteristics and advantages of this application will be further described in reference to embodiments and accompanying drawings.

DETAILED DESCRIPTION OF THE EMBODIMENTS

The technical scehemes of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure. All other embodiments obtained by persons of ordinary skill in the art based on the embodiments of the present disclosure without creative efforts shall fall within the scope of protection of the present disclosure.

It is to be understood that, all of the directional instructions in the embodiments of the present disclosure (such as top, down, left, right, front, back . . . ) can only be used for explaining relative position relations, moving condition of the elements under a special form (referring to figures), and so on, if the special form changes, the directional instructions changes accordingly.

In addition, the descriptions, such as the "first", the "second" in the present disclosure, can only be used for describing the aim of description, and cannot be understood as indicating or suggesting relative importance or impliedly indicating the number of the indicated technical character. Therefore, a feature indicated by the "first", the "second" can express or impliedly include at least one of the features. In addition, technical solutions of different embodiments can be combined with each other, however the technical solutions must base on that persons of ordinary skill in the art can realize the technical solutions, when the combination of the technical solutions occurs contradiction or cannot realize, it should consider that the combination of the technical solutions is impractical, and is not contained in the protection scope required by the present disclosure.

The present application provides a color film substrate 100. The color film substrate 100 is disposed opposite to the array substrate 50, and a liquid crystal is filled between the two to form a liquid crystal box. A spacer layer 40 is also formed on the color film substrate 100. The spacer layer 40 is used to support a gap between the two substrates to prevent the liquid crystal box from being in poor quality during the pressing process.

The spacer layer 40 includes two spacers of different heights. The section difference between the spacers is dependent on the thicknesses of the spacers themselves and the height from the upper surface of the color barrier 30 to the substrate. In the spacer manufacturing process, the positions and thicknesses of the spacers are controlled by utilizing a gray tone mask plate or a half tone mask plate in connection with different exposure degrees. If the level difference between the spacers is improved by changing the thicknesses of the spacers, then different gray tone mask plates or half tone mask plates are required. However, the gray tone mask plates or half tone mask plates have relatively high prices, thus improving the manufacturing cost of the color film substrate 100.

Referring to FIGS. 1 to 5, in the embodiment of the present application, the color film substrate 100 comprises:

a substrate 10, a first attachment region 11, a second attachment region 12, and a third attaching region 13 being formed on the substrate 10;

a color resist layer 30, the color resist layer 30 including a first color resist 31, a second color resist 32, 32a and a third color resist 33; the first color resist 31, the second color resist 32 and the third color resist 33 are respectively coated on a first attachment region 11, a second attachment region 12, a the third attachment region 13; the second color resist 32a is further coated on the first color resist 31 located on the first attachment region 11; and a spacer layer 40, the spacer layer 40 including a first spacer 41 and a second spacer 42, the first spacer 41 is coated on the color resist layer 30 of the first attachment region 11, and the second spacer 42 is partially coated on the color resist layer 30 of the second attachment region 12 or the third attachment region 13, the first spacer 41 having the same thickness as the second spacer 42;

the height of the upper surface of the first spacer 41 from a substrate 10 is higher than the height of the upper surface of the second spacer 42 from the substrate 10.

In the technical solution of the present application, a black matrix 20 is disposed on the substrate 10. The black matrix 20 defines a plurality of transparent regions; an opaque region is disposed between each adjacent two transparent regions, and the opaque region is an region in which the black matrix 20 is disposed; the first attachment region 11, the second attachment region 12 and the third attachment region 13 are all disposed in a strip shape, and an opaque area located between two adjacent transparent regions, and each include the plurality of transparent regions extending in a strip shape and the opaque region located between the every adjacent transparent regions. The first color resist 31 is coated to the plurality of first transparent regions of the first attachment region 11 and the black matrix 20 between the adjacent two first transparent regions; the second color resist 32 is coated to the plurality of second transparent regions of the second attachment region 12 and the black matrix 20 between the adjacent two second transparent regions; the third color resist 33 is coated to the plurality of third transparent regions of the third attachment region 13 and the black matrix 20 between the adjacent two third transparent regions. A color film substrate 100 comprises a plurality of first attachment regions 11, second attachment regions 12, and third attachment regions 13.

The black matrix 20 of the color film substrate 100 is coated with a color resist layer 30, and the color resist layer 30 includes a plurality of color resists of different colors; each of the color resists is respectively applied to the first attachment region 11, the second attachment region 12, and the third attachment region 13, so that the color resist layer 30 fills each of the transparent regions; and the color resist layer 30 may also be applied to the opaque region between the adjacent two transparent regions, that is, a part of the color resist is coated on the black matrix 20 such that the height above the portion of the black matrix 20 is increased.

In the technical solution of the present application, the color resist layer 30 includes a first color resist 31, a second color resist 32, 32a, and a third color resist 33, and the first color resist 31, the second color resists 32, 32a, and the third color resist 33 are color resists of different colors, respectively. Of course, in other color film substrates 100, color resists of more colors may be included. Correspondingly, more attachment regions require to be formed on the substrate 10 for being coated with each color resist, so that the liquid crystal display to which the color film substrate 100 is applied may display a more colorful image. In the embodiment of the present application, according to a conventional design manner, the first color resist 31, the second color resist 32, and the third color resist 33 are coated to the first attachment region 11, the second attachment region 12, and the third attachment region 13, respectively. Different from the conventional design, in the technical solution of the present application, the second color resist 32a is also partially coated on the first color resist 31 located on the first attachment region 11 such that the surface height of a region of the first color resist coated with the second color resist 32a is increased. The first color resist coated with the second color resist 32a is located on the black matrix 20 such that the region having the two color resists superimposed does not affect the transparent region.

The spacer disposed on the color film substrate 100 at least includes a first spacer 41 and a second spacer 42, and the first spacer 41 is coated on the color resist layer 30 of the first attachment region 11. The second spacer 42 is coated to the second attachment region 12 or the third attachment region 13, that is, the first spacer 41 is disposed on the second color resist 32a of the first attachment region 11. The second color resist 32a is disposed on the first color resist 31 of the first attachment region 11 such that the first spacer 41 is located above the two layers of color resist, and the second spacer 42 is located above one layer of color resist, so that a natural height difference is formed between the first spacer 41 and the second spacer 42 directly in the process of manufacturing the color resist, thereby simplifying the overall manufacturing process of the color film substrate 100.

After the color film substrate 100 and the array substrate 50 are aligned into a box, the free end of the first spacer 41 abuts on the array substrate 50 to support the color film substrate 100 and the array substrate 50, and after the formed liquid crystal box is slightly deformed during the pressing process, the array substrate 50 may further abut the free end of the second spacer 42, so that the liquid crystal cell may also be ensured to be well supported during the pressure process, and the internally filled liquid crystal has a large range of upper and lower limits, thereby avoiding the appearance of Mura (water ripple) and Bubble (bubble).

Further, in the technical solution of the present application, the thickness of the first spacer 41 and the second spacer 42 are the same, so that the first spacer 41 and the second spacer 42 are easily controlled in the process, and the cost is low.

In the embodiment of the present application, the thickness of the first color resist 31 of the first attachment region 11 is greater than the thickness of the second color resist 32 of the second attachment region 12;

and/or, the thickness of the first color resist 31 of the first attachment region 11 is greater than the thickness of the third color resist 33 of the third attachment region 13.

When the first spacer 41 and the second spacer 42 are located in the first attachment region 11 and the second attachment region 12, respectively, configuring the thickness of the first color resist 31 to be larger than the thickness of the second color resists 32, 32a may further increase the section difference between the first spacer 41 and the second spacer 42, so that the display panel may better ensure the display effect during the pressure bearing process. Further, the thicknesses of the first color resist 31 and the second color resists 32, 32a may be configured to be different, so that the display panel to which the color film substrate 100 is applied may display a more special display effect.

When the first spacer 41 and the second spacer 42 are located in the first attachment region 11 and the third attachment region 13, respectively, configuring the thickness of the first color resist 31 to be larger than the thickness of the third color resists 33 may further increase the section difference between the first spacer 41 and the second spacer 42, so that the display panel may better ensure the display effect during the pressure bearing process. Further, the thicknesses of the first color resist 31 and the third color resists 33 may be configured to be different, so that the display panel to which the color film substrate 100 is applied may display a more special display effect.

Figure 2:
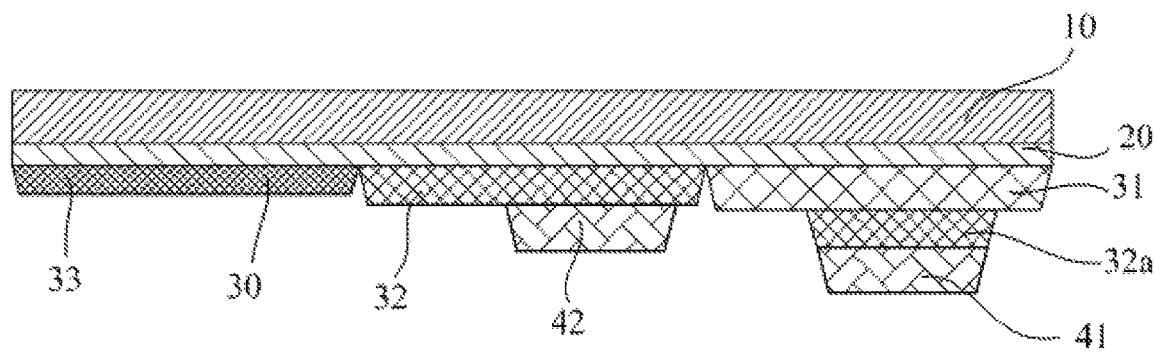
FIG. 2 is a partial structural view of the color filter substrate of FIG. 1 taken along the A-A direction.
Figure 3:
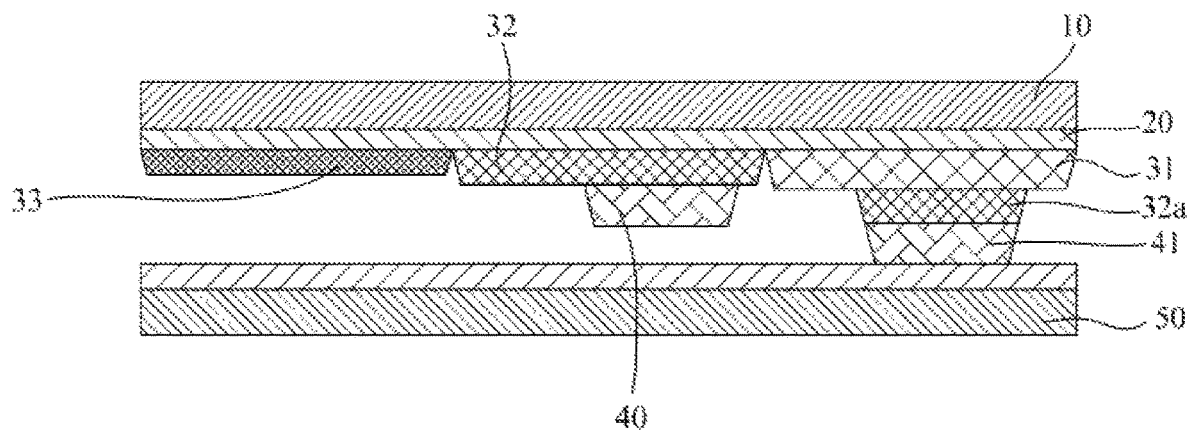
FIG. 3 is a sectional view of the display panel according to an embodiment of the present application.
Figure 4:
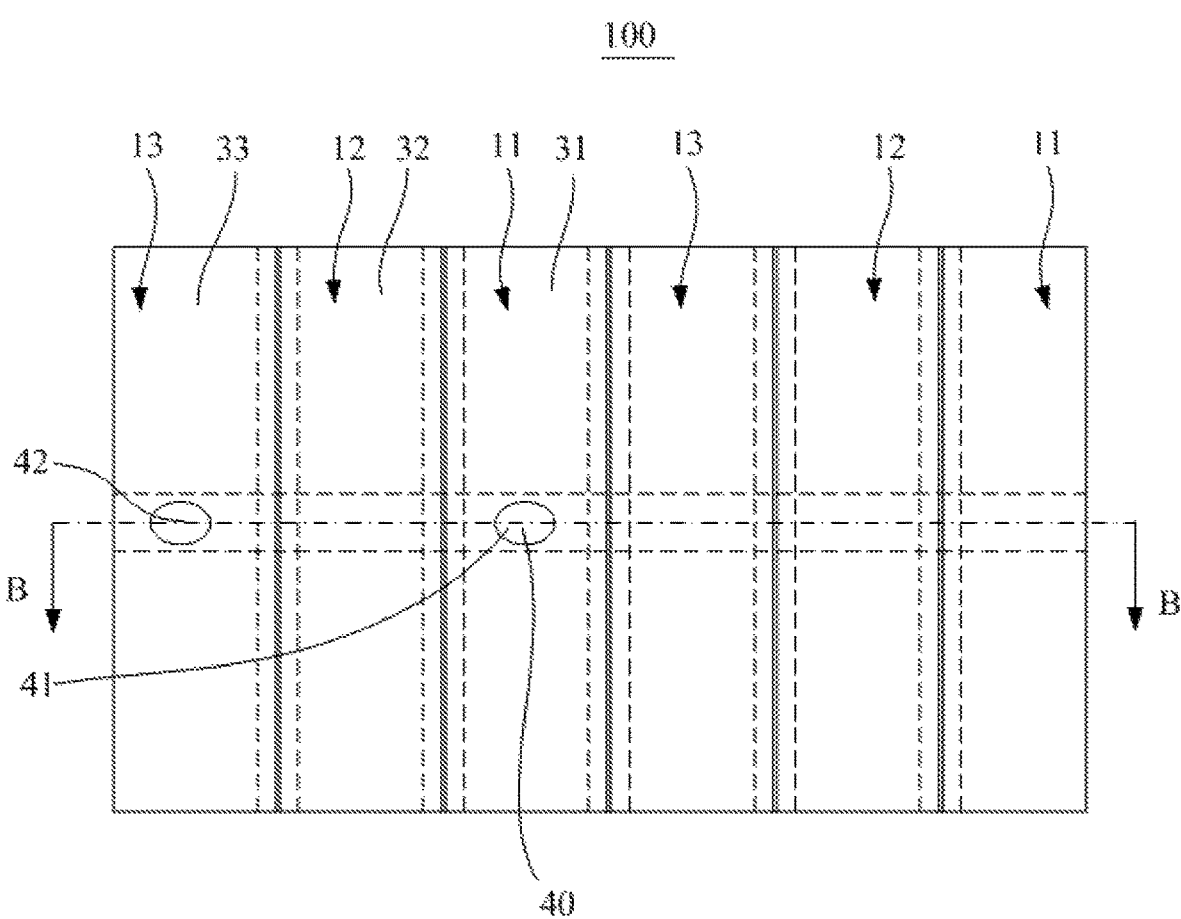
FIG. 4 is a top view of another embodiment of a color film substrate of the present application.
Figure 5:
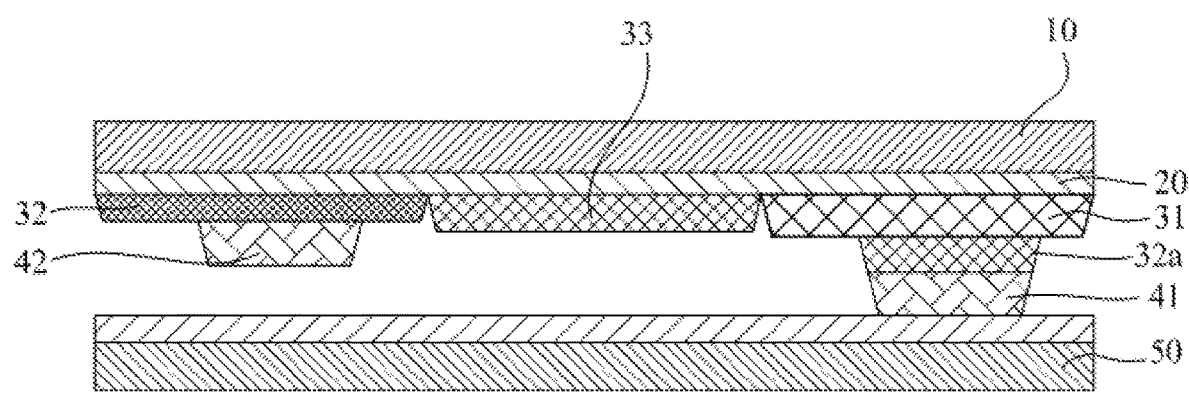
FIG. 5 is a partial structural view of the color filter substrate of FIG. 4 taken along the B-B direction.

Referring to FIGS. 1 to 3, the first attachment region 11, the second attachment region 12, and the third attachment region 13 are sequentially arranged side by side. In the present embodiment, the first spacer 41 and the second spacer 42 are respectively located in two adjacent attachment regions. Referring to FIGS. 4 and 5, in the present embodiment, the first spacer 41 and the second spacer 42 are respectively located in two attachment regions that are spaced apart.

Further, referring to FIG. 2, the first color resist 31 is a blue color resist, the second color resists 32 and 32a are green color resists, and the third color resist 33 is a red color resist. In the present embodiment, a part of the green color resist is formed on the blue color resist, and the first spacer 41 is further prepared on the green color resist of the first attachment region 11, so that the height of the free end of the first spacer 41 is increased. The size of the section difference is determined by the thickness of the green color resist and the thickness of the blue color resist. Referring to FIG. 3, after the color film substrate 100 and the array substrate 50 are aligned to form a liquid crystal box, the free end of the first spacer 41 abuts the array substrate 50, and a gap is formed between the free end of the second spacer 42 and the array substrate 50.

In an embodiment of the present application, the first attachment region 11, the third attachment region 13, and the second attachment region 12 are sequentially arranged side by side.

The first color resist 31 is a blue color resist, the third color resists 33 is a green color resist, and the second color resists 32, 32a are red color resists.

In the present embodiment, the red color resist pad is disposed on the blue color resist such that a section difference is formed between the first spacer 41 and the second spacer 42. The size of the section difference is determined by the thickness of the red color resist and the thickness of the blue color resist.

The thickness of the three layers of red, green, and blue color resists directly determines the transmittance, color domain, and white balance of the panel. By configuring the color resist of different thicknesses to meet different design requirements, the thickness of the blue color resist is generally greater than the configured thickness of the green color resist, and the thickness of the green color resist is greater than the thickness of the red color resist.

In the embodiment of the present application, the areas of the first spacer 41 and the second spacer 42 attached to the color resist layer 30 are the same. In order to make the process of the spacer easier, and make the formation of the spacer be easier to control, the areas of the first spacer 41 and the second spacer 42 are the same at the end faces of the color resist layer. Further, the shape of the first spacer 41 and the second spacer 42 are identical, so that the first spacer 41 and the second spacer 42 may be formed by the same process and the same fixture, thereby further simplifying the process of the spacer and reducing the production cost of the color film substrate 100.

In the embodiment of the present application, the spacer layer 40 may further include a third spacer. The first spacer 41, the second spacer 42 and the third spacer may be respectively disposed on the first attachment region 11, the second attachment region 12, and the third attachment region 13, and the thickness of the first spacer 41, the second spacer 42 and the third spacer may be kept consistent. Also, the opening size of the mask may be controlled according to actual production requirements to adjust the first spacer 41, the second spacer 42 and the third spacer to form different thicknesses, so that the spacer of the color film substrate 100 forms multiple section differences, thereby further improving the quality of the display panel.

In the embodiment of the present application, the color film substrate 100 further comprises a black matrix 20, and the black matrix 20 defines a plurality of transparent regions and a plurality of opaque regions on the substrate; the first attachment region 11, the second attachment region 12, and the third attachment region 13 are arranged in a strip shape, and each include the plurality of transparent regions arranged along a strip shape and the opaque region located between the two adjacent transparent regions;

the spacer is located on the color resist layer 30 in the opaque region.

The black matrix 20 may define, on the substrate 10, an opaque region, which is the region where the black matrix 20 is disposed. The black matrix 20 may prevent light leakage in adjacent regions of the two color resists, and may be configured to improve the contrast of the display panel.

The plurality of transparent regions and the plurality of opaque regions are divided into a plurality of pixel regions, and a part of the pixel regions is provided with the first spacer 41 and the second spacer 42.

In the embodiment of the present application, a spacer may be disposed on a part of the display region of the color film substrate 100 according to actual needs, so that the display panel may not only have good resistance to external pressure, but also improves the liquid crystal process margin and reduces the occurrence of poor display of the liquid crystal.

The present disclosure further provides a display panel, which includes a array substrate 50 and a color film substrate 100 whose specific structure may be understood with reference to the foregoing embodiments. Since all the technical solutions of all the above embodiments are used in the present display panel, at least the effects brought by the technical solutions of the foregoing embodiments are included and not repeatedly described herein. Among them, the array substrate 50 abuts on a side of the spacer layer 40 facing away from the substrate 10.

The display panel may be a liquid crystal display, may be a display screen of a television display, a computer display or a display screen of other medical and engineering testing instruments, or a display screen of a mobile phone or a wearable device.

The embodiments above are merely preferably embodiments of the present disclosure but are not to be construed as limiting the scope of the present disclosure, and any equivalent structural conversion devised based on the inventive concept of the present disclosure or using the drawing of the present disclosure, or a direct or indirect application of the present disclosure to another related technical field shall fall into the scope of protection of the present disclosure.

What is claimed is:

1. A color film substrate, wherein the color film substrate comprises:

a substrate on which a first attachment region, a second attachment region, and a third attaching region are formed;

a color resist layer including a first color resist, a second color resist and a third color resist; the first color resist, the second color resist, and the third color resist are respectively coated to the first attachment region, the second attachment region, and the third attachment region, wherein the first color resist, the second color resist, and the third color resist are continuously arranged side by side without gap and overlap; the second color resist is further coated on the first color resist located in the first attachment region;

a spacer layer including a first spacer and a second spacer, the first spacer being coated on a color resist layer of the first attachment region, the second spacer being partially coated on a color resist layer of the second attachment region or the third attachment region, the first spacer having a same thickness as the second spacer;

a height of an upper surface of the first spacer from the substrate is higher than a height of an upper surface of the second spacer from the substrate;

wherein a height of an upper surface of the first color resist located in the first attachment region from the substrate is greater than a height of an upper surface of the second color resist located in the second attachment region from the substrate;

and/or, the height of the upper surface of the first color resist located in the first attachment region from the substrate is greater than a height of an upper surface of the third color resist located in the third attachment region from the substrate; and wherein areas of the first spacer and the second spacer attached to the color resist layer are the same, shapes of the first spacer and the second spacer are identical;

the first color resist is a blue color resist, the second color resist is green color resists, and the third color resist is a red color resist;

a thickness of the blue color resist is greater than a thickness of the green color resist, and the thickness of the green color resist is greater than a thickness of the red color resist.

2. The color film substrate according to claim 1, wherein the first attachment region, the second attachment region, and the third attachment region are sequentially arranged side by side.

3. The color film substrate according to claim 1, wherein the color film substrate further comprises a black matrix, and the black matrix defines transparent regions and opaque regions on the substrate; each of the first attachment region, the second attachment region, and the third attachment region is arranged in a strip shape and includes a plurality of the transparent regions arranged along a strip shape and an opaque region located between each two adjacent transparent regions;

the spacer is located on a color resist layer of the opaque region.

4. The color film substrate according to claim 3, wherein the transparent regions and the opaque regions are divided into pixel regions, and a part of the pixel regions is provided with the first spacer and the second spacer.

5. A display panel, wherein the display panel comprises an array substrate and the color film substrate as recited in claim 1, and the array substrate is configured to abut on a side of the spacer layer facing away from the substrate.

6. The color film substrate according to claim 5, wherein the first attachment region, the second attachment region, and the third attachment region are sequentially arranged side by side.

7. A color film substrate, wherein the color film substrate comprises:

a substrate on which a first attachment region, a second attachment region, and a third attaching region arranged sequentially side by side are formed;

a color resist layer including a first color resist, a second color resist and a third color resist; the first color resist, the second color resist, and the third color resist are respectively coated to the first attachment region, the second attachment region, and the third attachment region, wherein the first color resist, the second color resist, and the third color resist are continuously arranged side by side without gap and overlap; the second color resist is further coated on the first color resist located in the first attachment region;

a spacer layer including a first spacer and a second spacer, the first spacer being coated on a color resist layer of the first attachment region, the second spacer being partially coated on the second attachment region, the first spacer having a same thickness as the second spacer, and areas of the first spacer and the second spacer attached to the color resist layer being the same;

a height of an upper surface of the first spacer from the substrate is higher than a height of an upper surface of the second spacer from the substrate;

wherein a height of an upper surface of the first color resist located in the first attachment region from the substrate is greater than a height of an upper surface of the second color resist located in the second attachment region from the substrate;

and/or, the height of the upper surface of the first color resist located in the first attachment region from the substrate is greater than a height of an upper surface of the third color resist located in the third attachment region from the substrate; and wherein areas of the first spacer and the second spacer attached to the color resist layer are the same, shapes of the first spacer and the second spacer are identical;

the first color resist is a blue color resist, the second color resist is green color resists, and the third color resist is a red color resist;

a thickness of the blue color resist is greater than a thickness of the green color resist, and the thickness of the green color resist is greater than a thickness of the red color resist.

* * * * *